US012713113B2

(12) United States Patent
Doig-Cardet et al.

(10) Patent No.: US 12,713,113 B2
(45) **Date of Patent: *Aug. 18, 2026**

(54) METHODS AND SYSTEMS FOR PROVIDING DYNAMICALLY COMPOSED PERSONALIZED MEDIA ASSETS

(71) Applicant: Netflix, Inc., Los Gatos, CA (US)

(72) Inventors: Christine Doig-Cardet, Los Gatos, CA (US); Bruce Wobbe, San Jose, CA (US); Sanford Holsapple, Sherman Oaks, CA (US); Alexander Lott, Tustin, CA (US); Sonali Sharma, Los Gatos, CA (US); Clay Gimenez, Campbell, CA (US); Jeremy Kelly, Los Gatos, CA (US); Jeff Kirchner, Woodland Hills, CA (US); Leena Janardanan, Santa Clara, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/949,009

(22) Filed: Nov. 15, 2024

(65) Prior Publication Data

US 2025/0080812 A1 Mar. 6, 2025

Related U.S. Application Data

(63) Continuation of application No. 18/515,106, filed on Nov. 20, 2023, now Pat. No. 12,177,542, which is a (Continued)

(51) Int. Cl.

*H04N 21/8549* (2011.01)
*H04N 21/234* (2011.01)

(Continued)

(52) U.S. Cl.

CPC ... *H04N 21/8549* (2013.01); *H04N 21/23424* (2013.01); *H04N 21/25891* (2013.01);

(Continued)

(58) Field of Classification Search

None

See application file for complete search history.

(56) References Cited

U.S. PATENT DOCUMENTS 10,356,456 B2 7/2019 Ranjeet et al.
10,455,297 B1 10/2019 Mahyar (Continued)

FOREIGN PATENT DOCUMENTS

EP 1919216 A1 5/2008
WO 2022187268 A1 9/2022

OTHER PUBLICATIONS

Communication Pursuant to Article 94(3)EPC, for European Patent Application No. 22711743.9, mailed Mar. 21, 2025; 11 pages.

(Continued)

*Primary Examiner* — James R Marandi

(74) *Attorney, Agent, or Firm* — Keller Preece PLLC

(57) ABSTRACT

The disclosed computer-implemented method may include accessing a media item that includes multiple media item segments that are to be played back in a specific manner. The method may also include generating playgraphs for the media item, where the playgraphs define different playback paths between media item segments. The method may next include selecting a specific playgraph from the generated playgraphs, and then providing the selected playgraph to a playback device. Playback of the media item according to the selected playgraph may thereby provide a customized presentation of the media item. Various other methods, systems, and computer-readable media are also disclosed.

20 Claims, 10 Drawing Sheets

Related U.S. Application Data continuation of application No. 17/810,259, filed on Jun. 30, 2022, now Pat. No. 11,871,095, which is a continuation of application No. 17/190,350, filed on Mar. 2, 2021, now Pat. No. 11,956,520.

(51) Int. Cl.

| | |
|---|---|
| ***H04N 21/258*** | (2011.01) |
| ***H04N 21/262*** | (2011.01) |
| ***H04N 21/2668*** | (2011.01) |
| ***H04N 21/845*** | (2011.01) |

(52) U.S. Cl.

CPC ... *H04N 21/26258* (2013.01); *H04N 21/2668* (2013.01); *H04N 21/8456* (2013.01)

(56) References Cited

U.S. PATENT DOCUMENTS

| | | | | |
|---|---|---|---|---|
| 10,555,023 | B1 | 2/2020 | Mccarthy | |
| 2006/0253782 | A1* | 11/2006 | Stark | H04M 1/72403 715/727 |
| 2008/0251575 | A1* | 10/2008 | Bowling | H04N 21/8153 235/375 |
| 2011/0307924 | A1 | 12/2011 | Roberts et al. | |
| 2012/0163770 | A1* | 6/2012 | Kaiser | H04N 21/4532 386/E9.011 |
| 2014/0222972 | A1* | 8/2014 | Thomas | G06F 16/1727 709/219 |
| 2014/0278969 | A1 | 9/2014 | Newell | |
| 2015/0172787 | A1 | 6/2015 | Geramifard | |
| 2015/0294685 | A1* | 10/2015 | Bloch | G11B 27/034 386/278 |
| 2017/0366780 | A1* | 12/2017 | Jehan | G11B 27/28 |
| 2018/0294013 | A1 | 10/2018 | Eppolito et al. | |

OTHER PUBLICATIONS

Non-final Office Action received in U.S. Appl. No. 17/190,350 dated Jun. 24, 2021, 13 Pages.

Non-final Office Action received in U.S. Appl. No. 17/810,259 dated May 25, 2023, 15 pages.

Final Office Action received in U.S. Appl. No. 17/190,350 dated Dec. 22, 2021, 16 pages.

International Search Report and Written Opinion received for International Application Serial No. PCT/US2022/018375 mailed Jun. 2, 2022, 16 pages.

Notice of Allowance received in U.S. Appl. No. 17/190,350 dated Dec. 14, 2022, 8 pages.

Notice of Allowance received in U.S. Appl. No. 17/190,350 dated Jul. 26, 2022, 8 pages.

Notice of Allowance received in U.S. Appl. No. 17/190,350 dated Mar. 25, 2022, 8 pages.

Notice of Allowance received in U.S. Appl. No. 17/810,259 dated Sep. 27, 2023, 8 pages.

Notice of Allowance received in U.S. Appl. No. 18/515,106 dated Sep. 20, 2024, 8 pages.

Summons to Attend Oral Proceedings as received in EP Application 22711743.9 dated Apr. 14, 2026.

* cited by examiner

| | First Clip | | Second Clip | | Third Clip | | Total Frames | Suggested Ranking |
|---|---|---|---|---|---|---|---|---|
| A | 160 | + | 160 | + | 80 | = | 400 | PVR #1 |
| B | 80 | + | 80 | + | 40 | = | 200 | PVR #3 |
| C | 160 | + | 80 | + | 80 | = | 320 | PVR #2 |
| D | 40 | + | 80 | + | 40 | = | 160 | PVR #4 |
| E | 40 | + | 40 | + | 40 | = | 120 | PVR #5 |

METHODS AND SYSTEMS FOR PROVIDING DYNAMICALLY COMPOSED PERSONALIZED MEDIA ASSETS

CROSS REFERENCE

This application is a continuation of U.S. application Ser. No. 18/515,106, filed Nov. 20, 2023, which is a continuation of U.S. application Ser. No. 17/810,259, filed Jun. 30, 2022, which is a continuation of U.S. application Ser. No. 17/190,350, filed Mar. 2, 2021, both of which are incorporated by reference in their entirety.

BACKGROUND

Each passing year results in the creation of many new movies, television shows, and other forms of audio and video content. This audio and video content is cumulative, in that older content remains available to users, while new content is continually added. As such, users may have access to so much audio and video content that they often become overwhelmed. To assist users in finding content that might be appealing to them, studios and other entities often create trailers or snippets of content to show users what the underlying audio or video content is generally about. From there, users may make the choice to watch the previewed content (e.g., a movie or television show), or may choose to view something else.

In some cases, movie studios or other content producing or content distributing entities may wish to create multiple trailers for a given movie or television show. In such cases, these entities would need to encode and digitally store each of these trailers separately. With the number of movies and tv shows continually growing, and with ever more selection among content, this continual generation and storage of multiple different trailers for each movie or television show may grow unwieldy and cumbersome.

SUMMARY

As will be described in greater detail below, the present disclosure generally describes methods and systems for generating and provisioning personalized media item playgraphs to playback devices. These personalized media item playgraphs allow multiple different trailers to be played from the same underlying media item.

In one example, a computer-implemented method for generating and provisioning personalized media item playgraphs to playback devices may include accessing a media item that includes multiple media item segments that are to be played back in a specific manner. The method may next include generating playgraphs for the media item, where the playgraphs define different playback paths between media item segments. The method may further include selecting a specific playgraph from the generated playgraphs, and then providing the selected playgraph to a playback device. Playback of the media item according to the selected playgraph thereby provides a customized presentation of the media item.

In some embodiments, the method further includes creating virtual assets for the media item. Each virtual asset may include a unique identifier that ties the virtual asset to the media item, as well as a specific selected playgraph that provides a defined playback pathway through the media item segments. In some examples, the media item may include multiple associated virtual assets.

In some cases, the method may further include determining that the media item is to be played back on the playback device, selecting a specific virtual asset among the virtual assets, and then streaming the media item and the selected virtual asset to the playback device. In this manner, the media item is playable on the playback device using the playgraph identified in the virtual asset.

In some examples, a specific virtual asset is selected for the playback device based on various personalization characteristics associated with a user of the playback device. The selected, personalized virtual asset may identify specific media item segments selected to appeal to the user of the playback device. The personalized virtual asset may further order the identified media item segments in a specified order that is designed to appeal to the user of the playback device. In some cases, the virtual assets may also identify the associated media item segments and the playback order using metadata tags.

In some embodiments, the media item may be a preview of a movie or television show. In such cases, the preview may include at least one introductory segment and at least one body segment. In some cases, the media item segments are selected from a plurality of different movies or television shows. In some examples, the method may further include selecting a specified virtual asset from among the associated virtual assets, and sending the unique identifier for the selected virtual asset to the playback device. As such, the playback device may play back the media item according to a stored playgraph that is associated with the virtual asset identified by the unique identifier.

In addition, a corresponding system may include at least one physical processor and physical memory comprising computer-executable instructions that, when executed by the physical processor, cause the physical processor to: access a media item that includes media item segments that are to be played back in a specific manner, generate playgraphs for the media item, where the playgraphs define various different playback paths between media item segments, select a specific playgraph from the generated playgraphs, and provide the selected playgraph to a playback device. In this manner, playback of the media item according to the selected playgraph may provide a customized presentation of the media item.

In some examples, the computer-executable instructions may further cause the physical processor to dynamically create a virtual asset associated with the media item upon determining that the media item is to be accessed by the playback device. The virtual asset may include a unique identifier that ties the virtual asset to the media item. The virtual asset may also include a specific selected playgraph that provides a defined playback pathway through the media item segments.

In some cases, the virtual asset may be created dynamically upon determining that personalization information associated with a user that is associated with the playback device is unavailable. In some embodiments, the computer-executable instructions may further cause the physical processor to track which media item segments the user viewed on the playback device, and add the resulting tracking information to personalization information associated with the user. In some examples, the resulting tracking information notes which media item segments were personalized to the user and which media item segments were randomly selected.

In some cases, the computer-executable instructions may further cause the physical processor to generate a cadence template that aligns the media item segments of the virtual asset with various portions of music associated with the media item. In some examples, the generated cadence template may govern the order in which the media item segments are shown and/or the amount of time each media item segment is shown within the established ordering. In some cases, the media item segments are arranged such that devices that lack playgraph support will play back at least one introductory segment and at least one body segment.

In some examples, the above-described method may be encoded as computer-readable instructions on a computer-readable medium. For example, a computer-readable medium may include one or more computer-executable instructions that, when executed by at least one processor of a computing device, may cause the computing device to access a media item that includes a plurality of media item segments that are to be played back in a specific manner, generate a plurality of playgraphs for the media item, the playgraphs defining various different playback paths between media item segments, select a specific playgraph from the plurality of generated playgraphs, and provide the selected playgraph to a playback device, wherein playback of the media item according to the selected playgraph provides a customized presentation of the media item.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
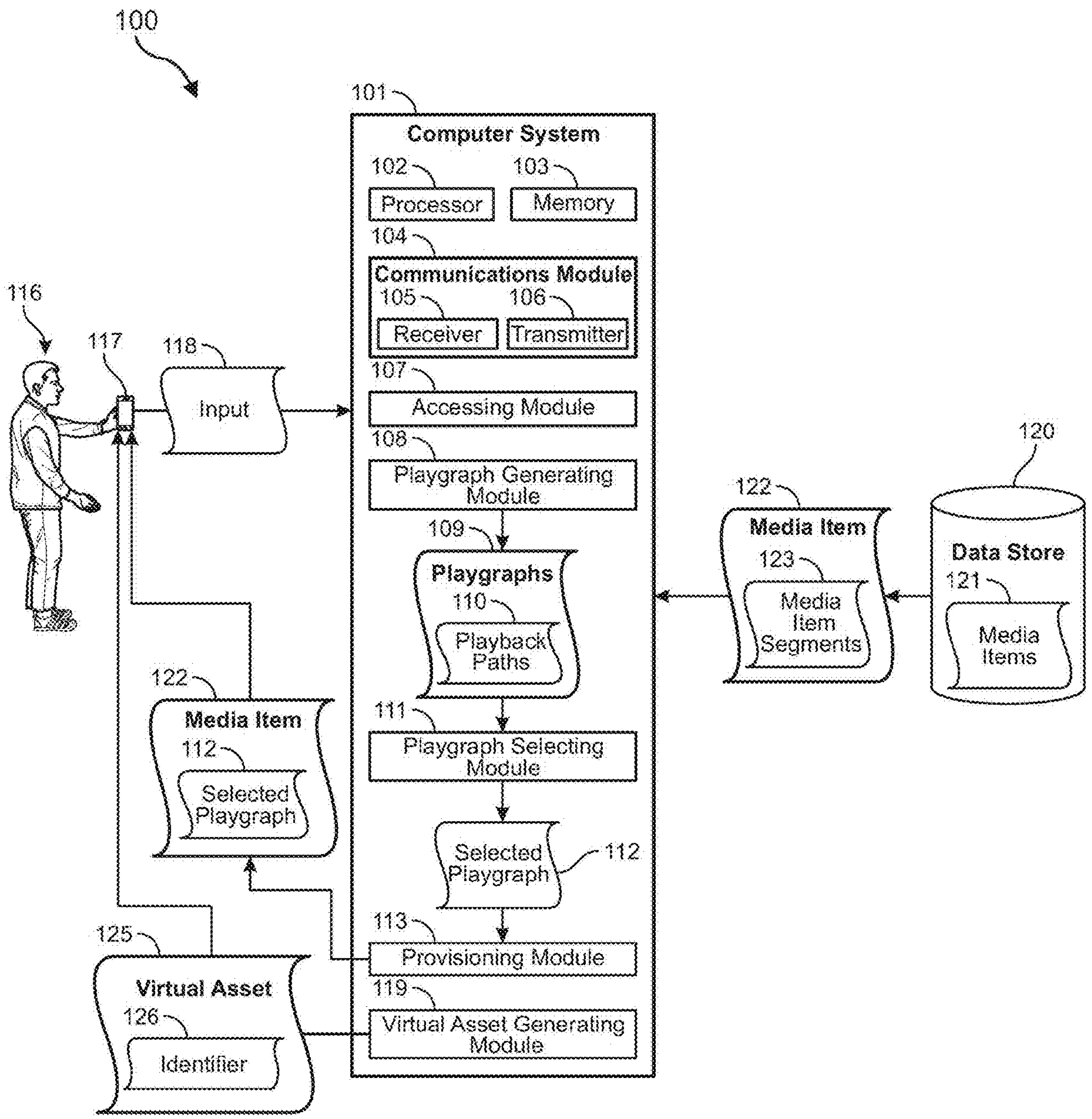
FIG. 1 illustrates a computing environment in which personalized media item playgraphs are generated and provisioned to playback devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to generating and provisioning personalized media item playgraphs to playback devices. As noted previously, the rate at which media content is generated is continually growing. Platforms that provide user-created content continue to grow in size, as do the number and size of professional movie and television studios. These movie and television studios, for instance, continually create new movies and television series to appeal to current and would-be subscribers. In order to entice people to watch these movies and television shows, studios create trailers that portray the media content in a specific way.

In some cases, for example, a single movie or television show may have different trailers that are designed to showcase the program in different ways. Some of the trailers for the program may emphasize action clips that include car chases and explosions to portray the media content as action-packed. Other trailers for the same program may focus more on witty or funny lines of dialogue to portray the program as more of a comedy. Still other trailers for the program may focus on dialogue and one-on-one scenes to portray the program as more of a documentary, science fiction, horror, drama, children and family film, or other type of trailer. Regardless of the different goals related to a given trailer, in traditional systems, each of these trailers is separately encoded as its own media file and is stored along with the other media content, including the underlying movie or tv on which the trailer is based. With so much media content being created and made available for streaming or download, the digital storage devoted to various trailer types continues to grow increasingly higher.

In contrast to these traditional methods, the systems and methods described herein may be configured to store a single data structure that includes the various media segments that may be used in a trailer, along with a playgraph that determines how playback will proceed through the media segments. Using a single encoded block of media segments and a playgraph that specifies how playback will proceed through the media segments, the systems herein may store a single data file and extract from that single data file multiple different trailers or introductory snippets that help generate interest in a media item. This single data file (often referred to as a "mega asset" herein) may include multiple different introductory clips that may be played at the beginning, middle, or end of each trailer, and multiple different types of clips that may provide a different feel or a different portrayal of the media item.

These methods and systems may also create virtual assets that contain different playgraph paths through the mega asset. Each virtual asset may combine different introductory clips, different body clips, and different closing clips to create a full trailer. The systems described herein may assign each virtual asset its own unique identifier, and may then select specific virtual assets for specific users, thereby personalizing the playback experience of the mega asset for each user. The systems described herein may also track each user's path through the virtual asset playgraph as a form of feedback, indicating whether the user stayed engaged, whether the user watched the media item previewed by the trailer, or whether the user performed some other anticipated or unanticipated action.

Programmatic video sequencing may also be applied to the virtual asset as it is played back on a playback device. Using programmatic video sequencing, scenes, edits, and cuts between clips may be timed to align with a specific song, beat, or rhythm. In such cases, the systems described herein may play back the scenes stored in the mega asset as indicated by the personalized, virtual asset, according to the timing or cadence of an associated music clip. Still other embodiments provide options for devices that may lack the ability to playback media items using a playgraph. Each of these embodiments will be described in greater detail below with regard to FIGS. 1-13.

FIG. 1 illustrates a computing environment 100 that includes a computer system 101. The computer system 101 includes software modules, embedded hardware components such as processors, or includes a combination of hardware and software. The computer system 101 includes substantially any type of computing system including a local computing system or a distributed (e.g., cloud) computing system. In some cases, the computer system 101 includes at least one processor 102 and at least some system memory 103. The computer system 101 includes program modules for performing a variety of different functions. The program modules are hardware-based, software-based, or include a combination of hardware and software. Each program module uses computing hardware and/or software to perform specified functions, including those described herein below.

The computer system 101 includes a communications module 104 that is configured to communicate with other computer systems. The communications module 104 includes any wired or wireless communication means that can receive and/or transmit data to or from other computer systems. These communication means include hardware interfaces including Ethernet adapters, WIFI adapters, hardware radios including, for example, a hardware-based receiver 105, a hardware-based transmitter 106, or a combined hardware-based transceiver capable of both receiving and transmitting data. The radios are cellular radios, Bluetooth radios, global positioning system (GPS) radios, or other types of radios. The communications module 104 is configured to interact with databases, mobile computing devices (such as mobile phones or tablets), embedded or other types of computing systems.

The computer system 101 also includes an accessing module 107. The accessing module 107 may be configured to access media items 121 from data store 120. The media items 121 may be substantially any type of media item, including videos, movies, television shows, songs, podcasts, audio books, picture galleries, or any other type of media item. Each of these media items 121 may include one or more different segments 123. These segments may be divided up in a variety of ways. In the case of movies or television shows, for example, media segments may include short snippets of dialogue, full or partial scenes, full or partial video shots (e.g., zoom shots, panorama shots, close-up shots, etc.), individual chapters, paragraphs, or sentences from an audio book, snippets from a podcast, or other divisible portions of the media item including single frames or images. Thus, the accessing module 107 may access the media item 122 including one or more of its component media item segments 123.

Once a specific media item 122 has been accessed, the playgraph generating module 108 may generate one or more playgraphs 109 for the media item. The playgraphs 109 specify one or more different playback paths through the media item segments 123. For example, in contrast to traditional playback systems that play back a media item sequentially from a starting position to an ending position, the embodiments described herein may be configured to begin playback at substantially any position within a media item 122 or may begin playback with substantially any media item segment 123. Then, from that specified starting point, the playgraph may dictate a flow through the media item 122 or the media item segments 123 that may be nonlinear, flowing between different out-of-order media item segments as dictated by the playgraph and/or as dictated by inputs 118 from a viewing user (e.g., 116). The playgraph may specify that, for instance, playback is to start with media item segment B, then go to media item segment D, then play media item segment A, omitting media item segment entirely, in a case where media item segments A, B, C, and D are all encoded into a single data structure.

In some embodiments, the media item 122 may be a trailer for a movie or television show. The trailer may include multiple different segments including an introductory clip, multiple body clips, and a closing clip. The playgraph 109 may dictate many different paths through these clips. In some cases, the introductory clip may be played initially, followed by body clip A, then body clip C, omitting body clip B in the process, or body clip C may be played before A and the closing clip may be omitted. As will be understood and as will be explained further below, the playgraph 109 may direct playback through multiple optional playback paths 110 that may be sequential or non-sequential relative to the order in which the media item segments 123 were initially encoded.

The playgraph selecting module 111 may then select, from among potentially many different playgraphs 109 that were generated for the media item 122, a selected playgraph 112 that is to be used for this specific playback (e.g., for this specific user 116 or playback device 117). The selected playgraph 112 may be personalized for the user 116, providing the user with a trailer that is played back in a customized manner to provide a specific feel or a specific appeal to that user. For instance, the trailer may highlight movie clips that showcase an actor or actress that the user 116 has shown an interest in, or may highlight certain segments that show the genre or some of the comedic moments of the movie. Other personalizations may also be made such that the trailer playback experience is truly customized to the user 116. After the playgraph 112 has been selected, the provisioning module 113 may stream, download, broadcast, or otherwise provide the media item 122 and selected playgraph 112 to the playback device 117, thereby providing a customized media item playback for that user. This process will be explained in greater detail below with regard to method 200 of FIG. 2 and with regard to the embodiments of FIGS. 3-13.

Figures 2, 3:
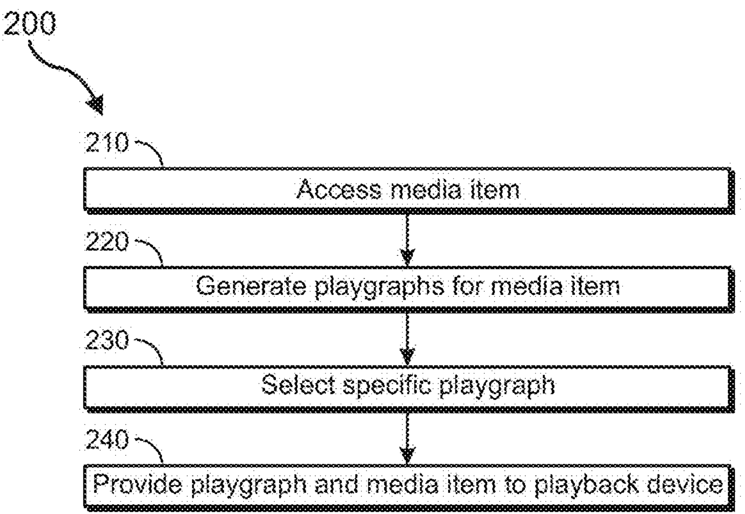
FIG. 2 is a flow diagram of an exemplary method for generating and provisioning personalized media item playgraphs to playback devices.
FIG. 3 illustrates an embodiment of a media item having multiple different virtual assets.
Figure 4:
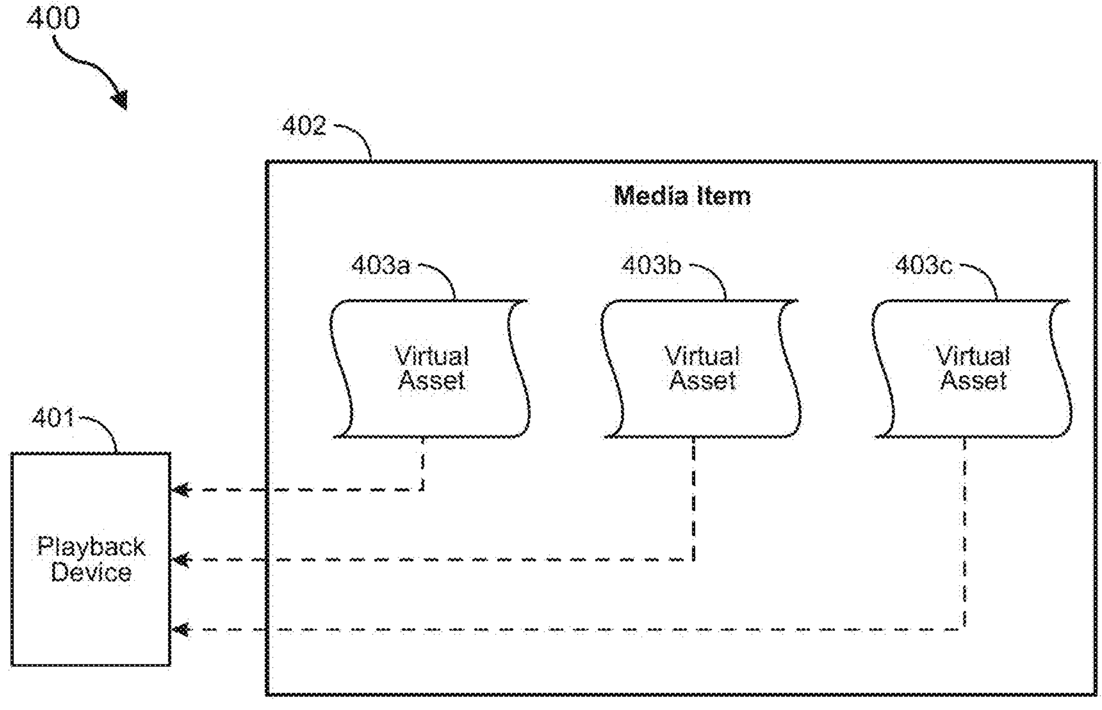
FIG. 4 illustrates an embodiment in which one or more virtual assets for a given media item are provisioned to a playback device.
Figure 5:
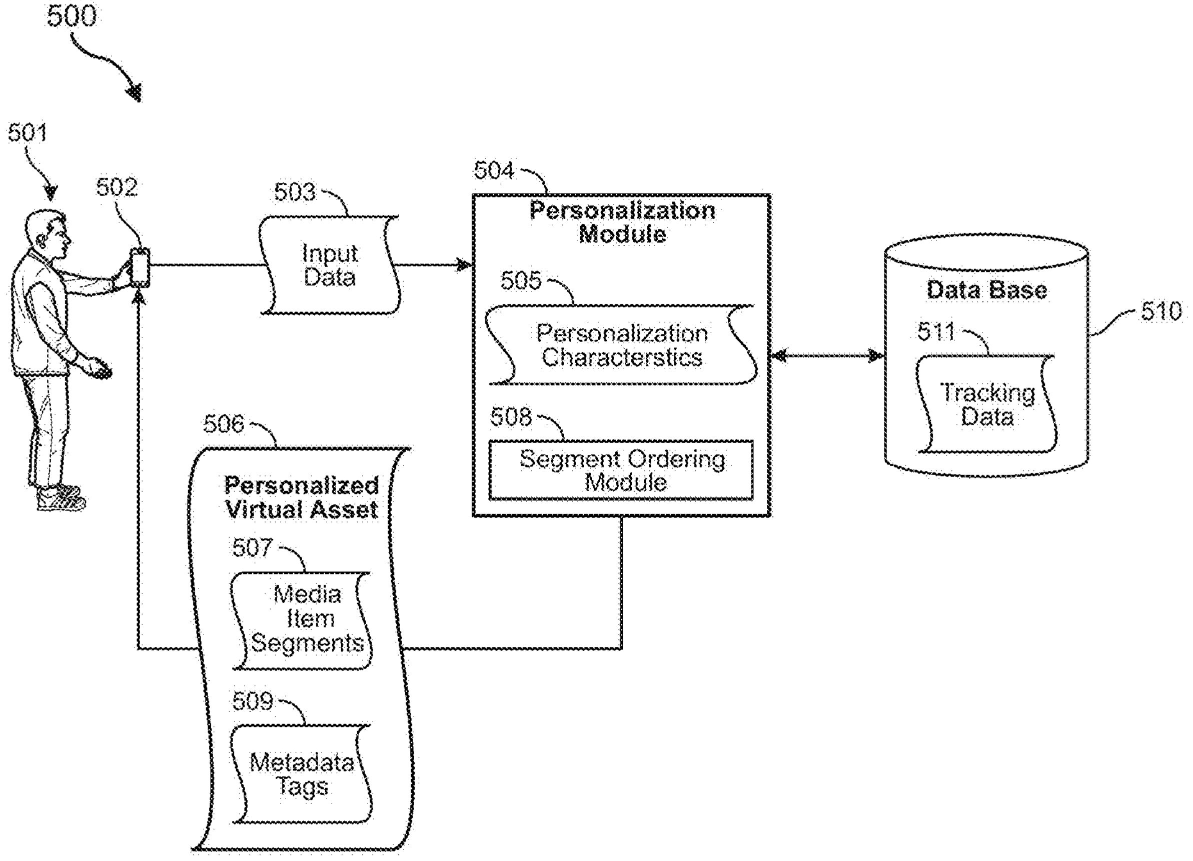
FIG. 5 illustrates an embodiment in which a personalized virtual asset for a media item is provisioned to a playback device.

FIG. 2 is a flow diagram of an exemplary computer-implemented method 200 for generating and provisioning personalized media item playgraphs to playback devices. The steps shown in FIG. 2 may be performed by any suitable computer-executable code and/or computing system, including the system illustrated in FIG. 1. In one example, each of the steps shown in FIG. 1 may represent an algorithm whose structure includes and/or is represented by multiple sub-steps, examples of which will be provided in greater detail below.

As illustrated in FIG. 2, at step 210 of method 200, one or more of the systems described herein may access a media item that includes multiple media item segments that are to be played back in a specific manner. While the media items 121 described herein may often refer to movie trailers, it will be understood that these principles may be applied to full-length movies, trailers for television shows or full-length television shows, trailers for audio books or full-length audio books, etc. In some cases, multiple movie clips may be selected and combined into a single media item 122 with multiple media item segments 123. This single media item (or "mega asset" herein) may include five, 10, 15, 20, or more clips from a movie, all sequentially combined into a single encoded data structure such as an MPEG 4 or h.264 video file. This mega asset may include many different types of clips from the same movie (or potentially clips from different movies of the same genre, for example), each of which may be identified using metadata. For instance, a clip that portrays comedy may be labeled with metadata indicating that it is a comedy clip, or a clip that portrays a specific actor or action scene or other indicator may be labeled as such. Accordingly, the media item 122 may include many different clips from the movie, arranged in substantially any order, and intended to provide the basis for many different versions of a trailer. These different versions, then, can be tailored to individual users.

At step 220 of method 200, the playgraph generating module 108 may generate multiple different playgraphs 109 for the media item 122. The playgraphs 109 may define different playback paths between media item segments 123. Thus, for example, if a media item 122 had five movie segments, one playgraph may indicate that a specific trailer is to be played back to a user (e.g., 116) by playing segments 2, 4, 3, and then finishing with 5. Another playgraph may indicate that a specific trailer is to be played back by ordering segments 1, then 4, then 5. Yet another playgraph may indicate that a specific trailer is to play segment 1, then segment 5, then segments 2, 3, and 4. It will be understood here that the playgraph 109 may include or exclude any of the clips included in the media item 122, and may play the clips in any order relative to the way the clips were encoded and stored as the finalized mega asset.

At step 230, the playgraph selecting module 111 may select a specific playgraph 112 from the various generated playgraphs 109. Specific playgraphs may have specific goals. For example, the goal of a specific trailer may be to appeal to a given user. Based on information that is known about that user (e.g., user 116), the playgraph selecting module 111 may select a playgraph that will provide a playback path 110 that chooses clips (and potentially the ordering of those clips) that will appeal to that user. The playgraph selecting module 111 may select other playgraphs for other users to appeal to the personal preferences of those users. Moreover, instead of the data store 120 having to store multiple different versions of a trailer to appeal to the tastes of different users, the embodiments herein allow storage of a single media file that includes all of the clips that may be used in a given trailer. Then, the computer system 101 determines which ordering of clips is to be used to create a customized trailer for each user. Once the playgraph selecting module 111 has selected the playgraph 112 for that user, the provisioning module 113, at step 240 of method 200, provides the selected playgraph 112 to the user's playback device 117. The user's device then plays back the media item 122 according to the selected playgraph, thereby providing a customized presentation of the media item that is tailored to the user 116.

Turning now to FIG. 3, a media item 301 is presented that has multiple different virtual assets 302*a* and 302*b*. The virtual asset generating module 119 of FIG. 1 may be used to generate a virtual asset 125. As the term is used herein, a "virtual asset" may refer to a data structure that includes a unique identifier 126 that ties the virtual asset 125 to the media item 122, as well as a specific selected playgraph 112 that provides a defined playback path 110 through the media item segments 123. Thus, in FIG. 3, virtual asset 302*a* may include a unique identifier 303*a* that uniquely identifies that virtual asset 302*a*, as well as a selected playgraph 304*a* that defines a specific playback pathway 305*a*. Similarly, virtual asset 302*b* may include a unique identifier 303*b* that uniquely identifies virtual asset 302*b*, as well as a selected playgraph 304*b* that defines a specific playback pathway 305*b*. While the media item 301 is shown as having two virtual assets, it will be understood that each media item may have substantially any number of virtual assets.

Each virtual asset may be looked at as a packaged or "canned" path through a series of media segments. Accordingly, as explained with regard to FIG. 1, a media item 122 may include many different segments 123, and each playgraph 109 may provide different pathways through those segments. A virtual asset may thus represent a specific type of trailer that plays back specifically chosen media segments in a specific order according to the selected playgraph. In one example, the virtual asset 302*a*, identified by identifier 303*a*, may include a playgraph 304*a* that plays back specifically selected media item segments according to a playback pathway 305*a* that portrays the media item as a comedy film. In this example, the same media item 301 may have another virtual asset, identified by identifier 303*b*, that includes a playgraph 304*b* that plays back different selected media item segments according to a playback pathway 305*b* that portrays the media item as a science fiction movie. Thus, in this example, the virtual asset 302*a* may be referred to as the "comedy trailer" and the virtual asset 302*b* may be referred to as the "science fiction trailer." Many other such trailers are possible, and each may be uniquely identified. In this manner, a media item that has been encoded into a single, fixed form, can be the source of many different trailers or other types of media previews.

In some cases, the playback device 117 of FIG. 1 may be configured to play back a trailer using a virtual asset. In one embodiment, the computer system 101 may determine which media item is to be played back on the playback device, determine which virtual asset is to be used, and then stream the media item and the selected virtual asset to the playback device. Then, the playback device 117 plays back the media item segments according to the playgraph identified in the virtual asset. For example, as shown in embodiment 400 of FIG. 4, a media item 402 may include many different virtual assets 403*a*, 403*b*, and 403*c*. Any one of these virtual assets may be used to provide a preview of the media item 402 on the playback device 401. When the playback device 401 receives a specific virtual asset (e.g., 403*b*), the playback device will access the playgraph identified in that virtual asset and will play back the media item 402 according to that playgraph.

In this manner, a movie producer or movie distributor may create a single data structure that stores multiple different clips that may be used in a trailer. The movie producer or distributor may then determine which version of the trailer is to be shown to a given user. Once the type or version of trailer has been chosen, the virtual asset corresponding to that type of trailer may be sent to the playback device 401, along with the media item 402, for playback according to the playgraph identified in the virtual asset. Over time, movie producers or distributors may continue to add new virtual assets to existing media items, or may remove previously existing virtual assets from the media item. At least in some cases, end users may be permitted to create their own virtual assets for a media item. These user-generated virtual assets may specify customized playback paths that are then associated with a unique identifier for that virtual asset.

In some cases, a specific virtual asset may be selected for a playback device based on personalization characteristics associated with a user of the playback device. For example, in FIG. 4, if media item 402 has three different virtual assets 403*a*, 403*b*, and 403*c*, each representing a different style of trailer or a different version of a trailer, the trailer version most suited to a given user may be selected and provided to that user. As shown in embodiment 500 of FIG. 5, for example, a user 501 may use their phone, tablet, PC, television, streaming stick, or other playback device 502 to play back media including movies, television, and songs. When playing back these media items, the user 501 may provide input data 503 that may be used to identify preferences or to select certain media items for playback or for preview. The personalization module 504 may be configured to note these personalization characteristics 505, and may build a profile of the user 501 over time.

The personalization characteristics 505 may include preferences for certain genres, certain actors or actresses, preferences for movies from certain time periods (e.g., the 70's or 80's), preferences for certain directors, preferences for musical groups or artists, or other personal preferences. These preferences may be developed and refined over time, as the personalization module 504 collects data regarding the user's interactions with the data streaming platform (e.g., tracking data 511, which may be stored in database 510), and collects other information that may be used to provide personalized trailers or other personalized content. Additionally or alternatively, personalization characteristics 505 may include an indication of the user's country, locale, past views, other user's views, impressions (e.g., which media items were presented to the user in a user interface), indications of whether the user watched the trailer to completion and whether they watched the media item being previewed, as well as indications of which menu items or features the user selected after watching the trailer.

Accordingly, in this manner, the personalization module 504 may be designed to select specific media item segments or specific virtual assets that appeal to the user 501 of the playback device 502 according to the determined personalization characteristics 505. Once a specific personalized virtual asset 506 has been selected, the personalization module 504 may send that personalized virtual asset 506 to the playback device 502, after which the media item segments 507 of the corresponding mega asset will be played back according to a playgraph associated with the personalized virtual asset 506.

In some cases, the personalized virtual asset 506 arranges the identified media item segments in a specific order that is designed to appeal to the user 501 of the playback device 502. The segment ordering module 508 of the personalization module 504 may determine the order in which the media item segments 507 are to be played back. The order may be sequential relative to the underlying mega asset, or may be non-sequential. Administrators or other users that design personalized virtual assets (e.g., 506) may be free to select which media item segments 507 will be part of a given virtual asset, and may also select the order in which those selected segments are shown. Thus, each personalized virtual asset may be individually customized to many different, specific users, while all being based on the same underlying single data structure.

In some embodiments, the virtual assets (e.g., 506) identify the associated media item segments 507 and the playback order using metadata tags 509. The metadata tags 509 may specify media item segments by number or by name or by timestamp within the mega asset. The metadata tags 509 may also specify the order in which the media item segments 507 are to be played back, indicating, for example, that media item segments A, B, and D are to be played back in a specific personalized virtual asset in the order D, A, B. Other users may receive metadata tags 509 indicating that media item segments B, C, and D are to be played back in the order C, B, D, and so on. Thus, even in an example mega asset that only included four media item segments (A, B, C, and D), many playback combinations and orderings are possible.

Figure 6:
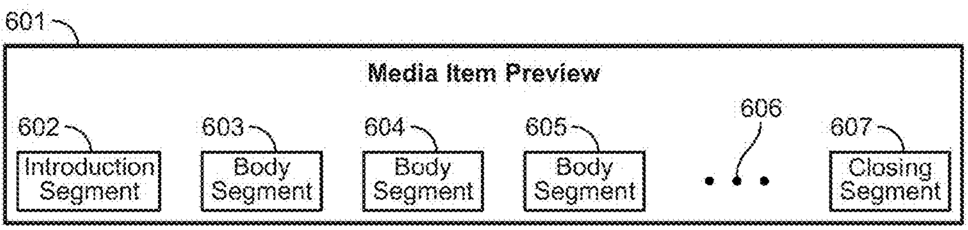
FIG. 6 illustrates an embodiment of a media item preview that includes multiple different potential segments.

In some examples, a media item (e.g., 402 of FIG. 4) may be a preview of a movie or television show, and that preview may include at least one introductory segment and at least one body segment. For instance, as shown in FIG. 6, the media item 601 may include introductory segment 602, body segments 603-605 (along with potentially other body segments 606), and a closing segment 607. Other types of body segments may also be used, and not every preview may include introductory, body, or closing segments. Each media item segment may be identified using metadata tags (e.g., 509 in FIG. 5). In some cases, an introductory segment 602 may be a segment that introduces the media item 601. In some embodiments, the introductory segment 602 is shown at the beginning of each virtual asset, regardless of whether that virtual asset is intended to promote a comedy, a drama, an action film, etc. In other cases, different introductory segments or even body segments may be used as an introduction. In some cases, different trailers may be composed of an introductory segment 602, one or more body segments 603-605, and a closing segment 607. Any of these media item segments may be played back in any order. The playgraph associated with the virtual asset (e.g., personalized virtual asset 506 of FIG. 5) may indicate which segments are to be played as part of any given trailer, as well as the order in which those segments are to be played. The media item segments 602-607 may all be from the same movie or television show, or they may be aggregated from different films (e.g., from multiple films in a given film series) or may be aggregated from different television shows (e.g., from multiple episodes of a television show).

In some embodiments, the user 501 may have never used the media streaming service or other type of media item host. In such cases, the media streaming service may not have any tracking data 511 or inputs from the user 501 on which to personalize a virtual asset. Accordingly, in such cases, the media streaming service (which may include or may implement computer system 101 of FIG. 1 and/or the personalization module 504 of FIG. 5) may dynamically create a virtual asset on the fly. The virtual asset generating module 119 of FIG. 1 may, upon determining that personalization information associated with user 116 (or user 501) is unavailable, automatically generate a virtual asset 125. The virtual asset 125 may include a generic playgraph that is used by default when the requesting user is unknown, or may include a curated playgraph that contains segments chosen based on popularity, or may include a specific version of playgraph that is designed to portray a documentary feel, or a foreign drama feel, etc.

The computer system 101 may then track which media item segments the user 116 viewed on the playback device 117 based on the version of the mega asset that was ultimately shown to the user. This selection data and other viewing information may be stored in a data store and used to personalize virtual assets to that user in the future. Moreover, this tracking data may be used to personalize virtual assets for other users that have similar tastes or have made similar viewing selections. In at least some cases, the resulting tracking information may note which media item segments were personalized to the user and which media item segments were randomly selected or were selected from a list of default virtual assets. Over time, and after tracking the viewing and media selection actions of many different users, the computer system 101 may build up a personalization database that allows it to tailor virtual assets to each user, knowing which media item segments or which virtual assets are likely to have the desired effect of leading the user to watch, listen to, or otherwise consume a given media item.

In some cases, instead of sending a full virtual asset to a user's playback device, the computer system 101 may simply send a unique identifier that identifies the virtual asset. For example, in some embodiments, the playback device 117 may have one or more virtual assets stored in memory. The computer system 101 may thus choose an appropriate virtual asset to send to the user's playback device 117 and, instead of sending the virtual asset 125, the computer system may only send an identifier 126 identifying the selected virtual asset. The user's playback device 117 will then access the virtual asset identified by the identifier 126 and play back the specific media item segments identified in that virtual asset. In this manner, the playback device 117 plays back the media item 122 according to a stored playgraph that is associated with the virtual asset identified by the unique identifier 126. In some cases, a media item may not have an associated virtual asset. In such cases, the computer system 101 may dynamically create a virtual asset 125 associated with the media item 122. Such creation may occur upon determining that the media item 122 is to be accessed by the playback device 117 (e.g., upon receiving an input 118 from the playback device indicating that the media item 122 is to be played. The dynamically created virtual asset may be assigned a unique identifier that ties the virtual asset 125 to the media item 122 and thereby provides a specific playgraph that offers a defined playback pathway through the media item segments 123 associated with the media item 122.

In some cases, a virtual asset may be generated based on multiple different media items. While the embodiments described above generally refer to scenarios where a playgraph defines a playback path through a single mega asset, it will be recognized that a playgraph may specify a playback path through a plurality of different media items and/or media clips. Thus, for example, the computer system 101 of FIG. 1 may be configured to access alternative media items in addition to or in place of media item 122. These alternative media items may include live television shows or newly released television shows or movies that are not part of an existing mega asset. In such cases, the playgraph generating module 108 may be configured to generate a playgraph 109 that defines a playback path 110 through multiple different alternative media items. This playback path 110 may include a portion of a mega asset, or may define a playback path that is comprised solely of alternative media items. In this manner, playback on the user's device 117 according to such a playgraph would include portions of many different (potentially updated or newly released) media items.

In one specific embodiment, the computer system 101 may access various alternative media items (e.g., that are separate from an underlying mega asset), generate an updated playgraph 109 that includes one or more of these alternative media items, and may then provide the updated playgraph to the playback device 117. As such, the playback device 117 will play back the various alternative media items according to the updated playgraph. Allowing a playgraph to draw from multiple different media items (in addition to or instead of drawing from a mega asset) may provide greater flexibility and an increased level of personalization. For instance, instead of having a single mega asset to draw from, the computer system 101 may access many newly released or updated media items and create playgraphs that include some or all of these different media items. In this manner, as media items come and go from a media distribution service, for example, each user is continually provided an updated and personalized playgraph that includes clips of newly released or newly added shows from many different media items that users are likely to want to see.

Figures 7, 8:
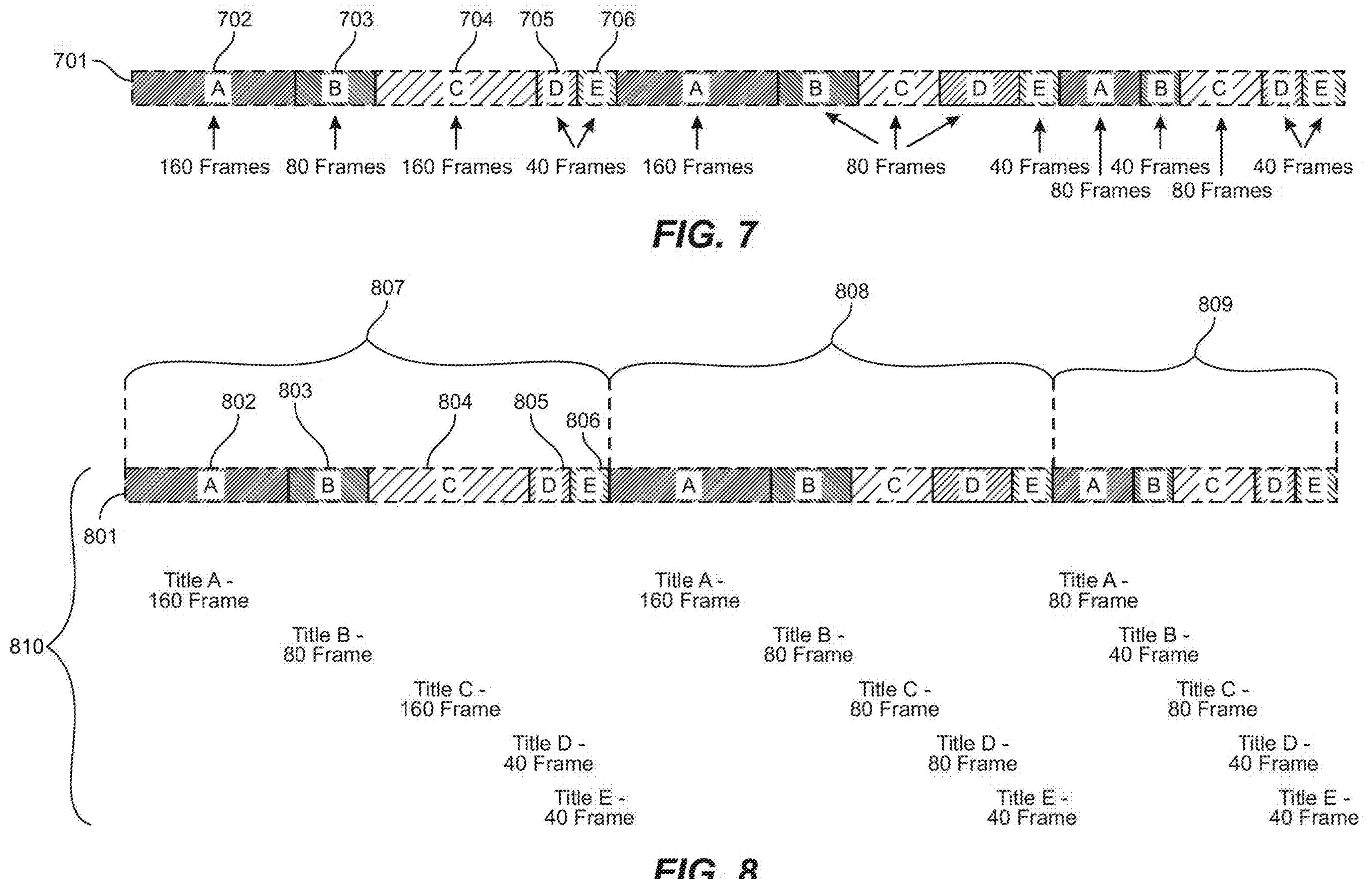
FIG. 7 illustrates an embodiment of a media item having multiple media segments that are arranged in a specified order.
FIG. 8 illustrates an embodiment of a media item having multiple media segments of varying lengths that are arranged in a specified order to match corresponding musical elements.

FIG. 7 illustrates an embodiment in which a cadence template is generated for a given virtual asset. The computer system 101 of FIG. 1 or similar computing system or functionality module may generate the cadence template. As the term is used herein, a "cadence template" may refer to a pattern or design that aligns music with media item segments or edits between segments. The music may include a song that is to be used with a trailer, a musical score, a music snippet, a collection of songs or snippets, or other musical arrangement. The media item segments or clips, as noted above, may be substantially any length, and may be in any order. The media item 701 of FIG. 7, for example, may include different media item segments: segment A (702), segment B (703), segment C (704), segment D (705), and segment E (706). The corresponding music to which the media item segments are to be aligned may have specific beats or pauses or rhythms that are to be followed when stringing the media item segments together. When properly aligned, the changes between media item segments, or the changes between video shots, or the changes between video scenes will align with the beats or rhythms of the accompanying music. Thus, generating a cadence template may align the media item segments of the virtual asset with music that will be played back alongside and in tandem with the video, sounds, and dialogue of the media item.

FIG. 7 may thus represent a media item 701 with a predetermined collection of clip lengths. For example, segment A (702) has a clip length of 160 video frames. Segment B (703) has a clip length of 80 frames, segment C (704) has a clip length of 160 frames, segment D has a clip length of 40 frames, and segment E (706) has a clip length of 40 frames. It will be understood that the clips may include substantially any number of video frames. Moreover, it will be understood that the media item segments (i.e., clips) may be edited or cut to include a specified number of video frames (e.g., 160 frames). The media item segments 702-706 do not need to be played back sequentially and can be played in any order, as specified in a corresponding playgraph. The clips may be from different television shows or different movies, or may be from the same tv show or movie. Generating a cadence template ensures that all of the cuts or changes between shots or scenes are on the beat of the music. In some cases, the computer system 101 may be configured to analyze the music that is to accompany the trailer and may determine the music's number of beats per minute. The cadence template may then reorder or cut (or extend) the clip lengths to ensure that the clip lengths match the music's number of beats per minute.

As can be seen in FIG. 8, the clips 802-806 of media item 801 may be played in different groupings and the clips themselves may be cut into different lengths. Grouping 807 (which may comprise one version of a trailer) may include Title A (802) with 160 frames. In grouping 808, Title A may also include 160 video frames. However, in grouping 809 (which may be another version of a trailer), Title A only has 80 video frames, indicating that it has been cut to include only half the original number of frames. Other numbers of frame changes are apparent in the cascading listing of frame numbers 810.

Figure 9:
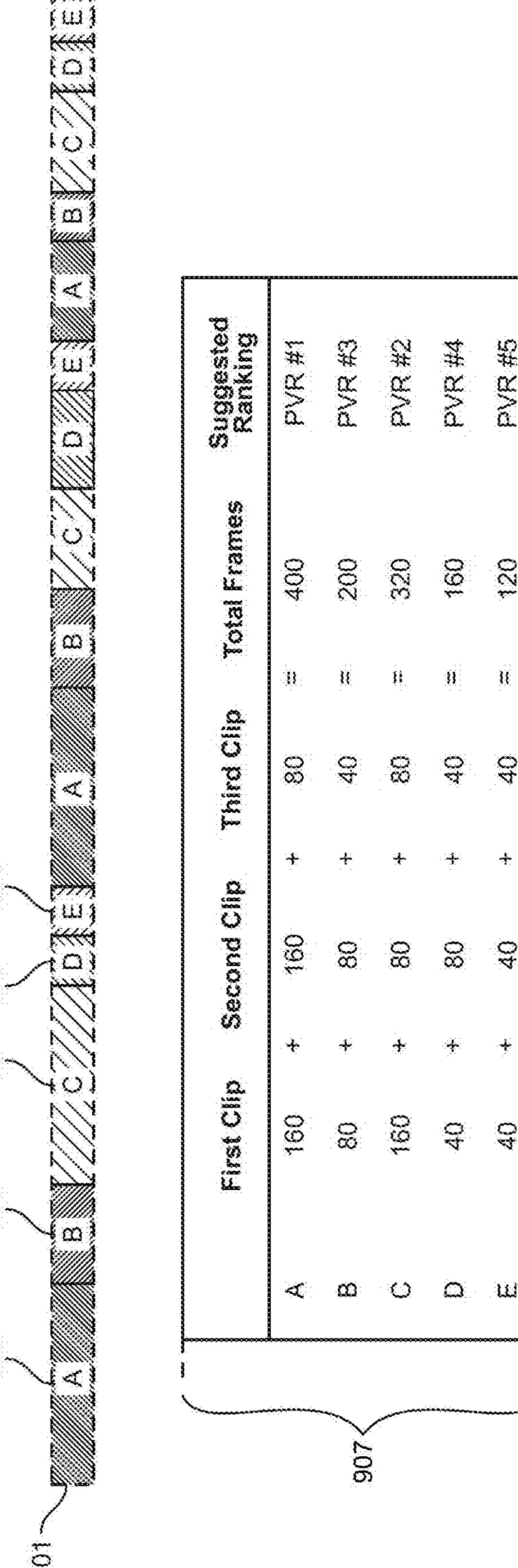
FIG. 9 illustrates an alternative embodiment of a media item having multiple media segments of varying lengths that are arranged in a specified order to match corresponding musical elements.

In some cases, the title of the media item or its associated level of importance (e.g., it's a hotly anticipated new release) dictate the cadence. For instance, more important titles may have more video total video frames allotted to them, while lesser movies or tv shows may have fewer total video frames allotted to them. In some cases, the level of importance associated with a given title is based on personalization. As, the cadence template may show more of titles that are likely to appeal to that user. Thus, as shown in FIG. 9, a given media item 901 may have many different clips from the same movie or movie series or tv show or tv series, or may have clips from different movies or tv shows. These movies may be linked by a common actor or common director or common theme or genre. Titles that are most likely to appeal to the user may receive a higher total number of video frames within a given cadence template.

Figure 10:
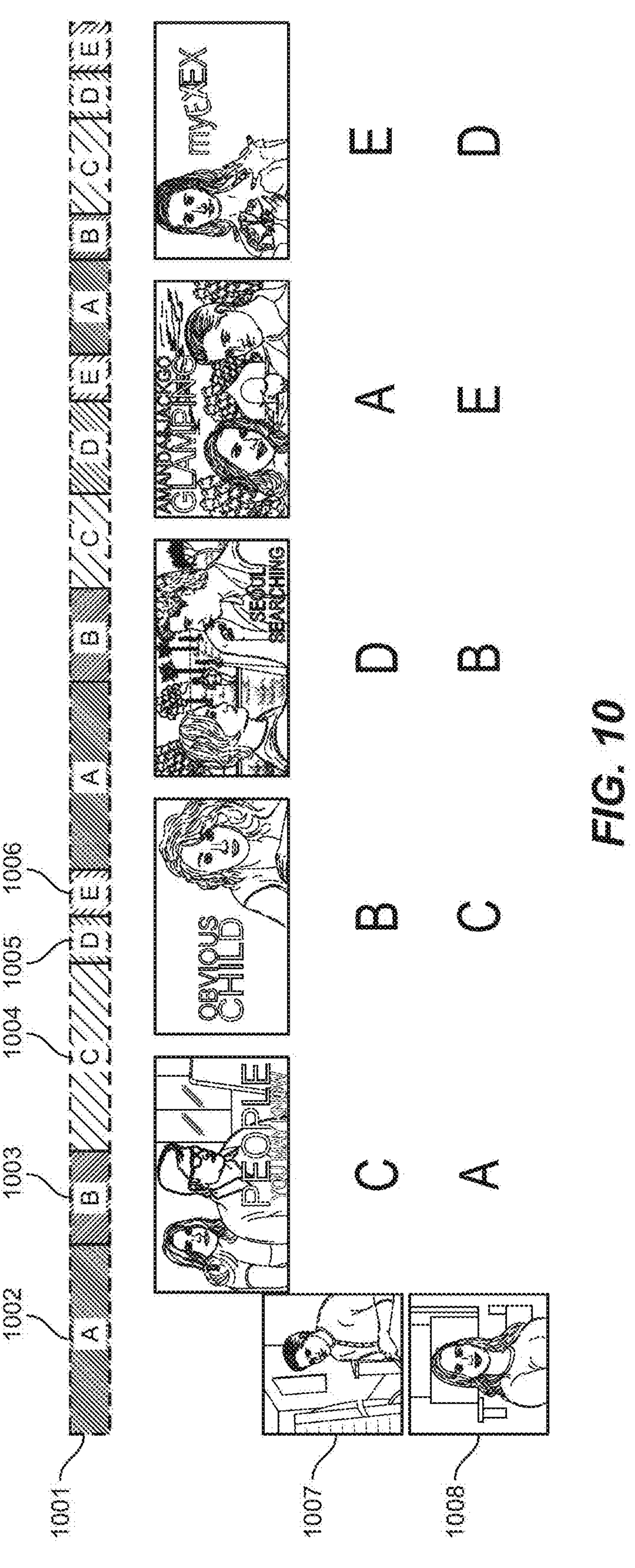
FIG. 10 illustrates an alternative embodiment of a media item having multiple media segments of varying lengths that are arranged in a specified order to match corresponding musical elements.

As can be seen in chart 907, clips A (902) include a first clip with 160 frames, a second clip with 160 frames, and a third clip with 80 frames for a total of 400 frames. This is assigned a personalization ranking of #1. Other clips with lower personalization rankings have lower numbers of total frames (e.g., clips C (904) have 320 total frames and a ranking of #2, clips B (903) have 200 total frames and a ranking of #3, clips D (905) have 160 total frames and a ranking of #4, and clips E (906) have 120 total frames and a ranking of #5. Thus, titles that are determined to be more important to a user (based on any of the personalization factors described above) are ranked higher and include a higher number of video frames in the corresponding cadence template. Because each title may have many different clips to choose from, and different clip lengths within those clips, each trailer may be customized specifically for each user. Accordingly, FIG. 10 illustrates an embodiment in which a media item 1001 includes clips A (1002), B (1003), C (1004), D (1005), and E (1006). User 1007 may receive portions of these clips A-E, but in the order C, B, D, A, E. Whereas user 1008 may receive different portions of each of these clips A-E, but in the order A, C, B, E, D. Each of these clips may be aligned with the music that goes along with the trailer, according to the corresponding cadence template.

The cadence template thus governs the order in which the media item segments are shown and the amount of time each segment is shown within the established ordering. Furthermore, the cadence template may provide a certain level of intensity. For example, the pace of cutting, sound effects, volume levels, etc. and other elements may affect how intense a trailer comes across to a user. The cadence templates may thus take these elements into account and may generate trailers with high, medium, or low levels of intensity to make the trailer feel more or less intense as desired.

In some cases, a playback device may not support playgraphs or non-sequential playback of a media item. In such cases, the media item segments may be arranged such that devices that lack playgraph support will play back specific segments and then stop playback. For instance, playback devices that do not support playgraph may play an introductory segment followed by at least one or two body segments. Alternatively, such playback devices may simply be instructed to begin playback at a specified point in the mega asset and continue playback sequentially straight to the end. Thus, even for devices that don't support playgraph playback, such users may still be able to view trailers that are at least somewhat tailored to or customized for them.

Accordingly, methods and systems are provided that personalize a trailer to a given user while using smaller amounts of disk space. Indeed, a single mega asset may be stored that provides clips for many different potential trailers. Playgraphs may then be generated that lead the playback device to specific clips in a specific order to create a tailored trailer for that user. Moreover, cadence templates may be used to align the customized trailer to a given song or rhythm. This may allow content creators to create different intensity levels within the trailers and truly portray the film or television show in different ways to different people.

Figure 11:
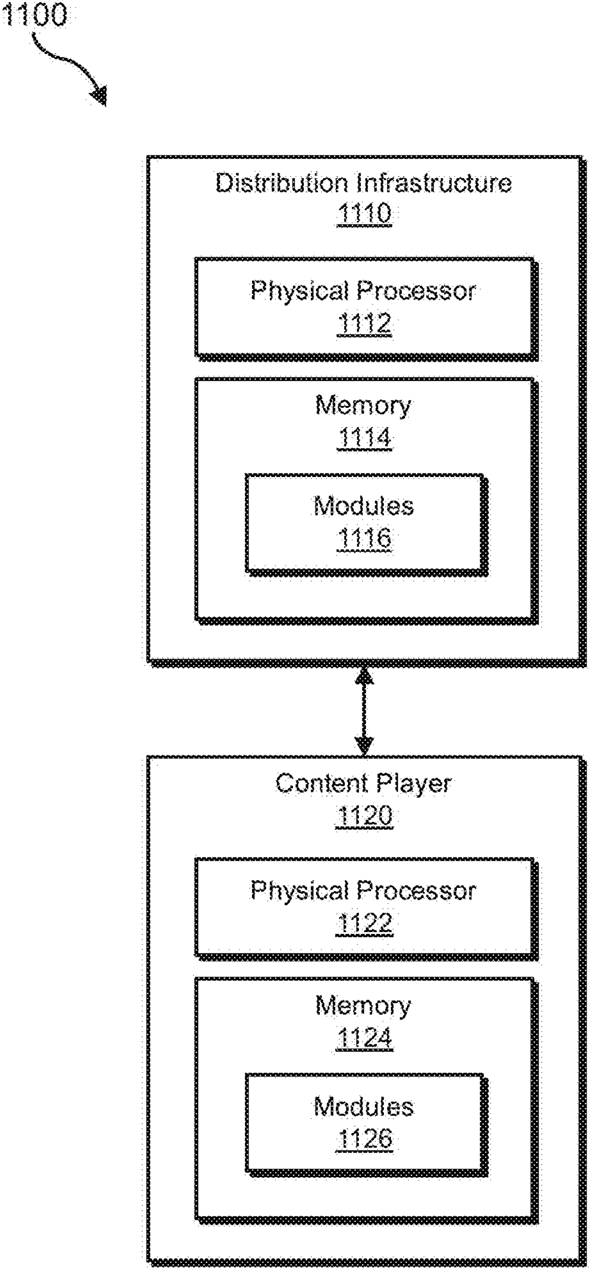
FIG. 11 is a block diagram of an exemplary content distribution ecosystem.
Figure 12:
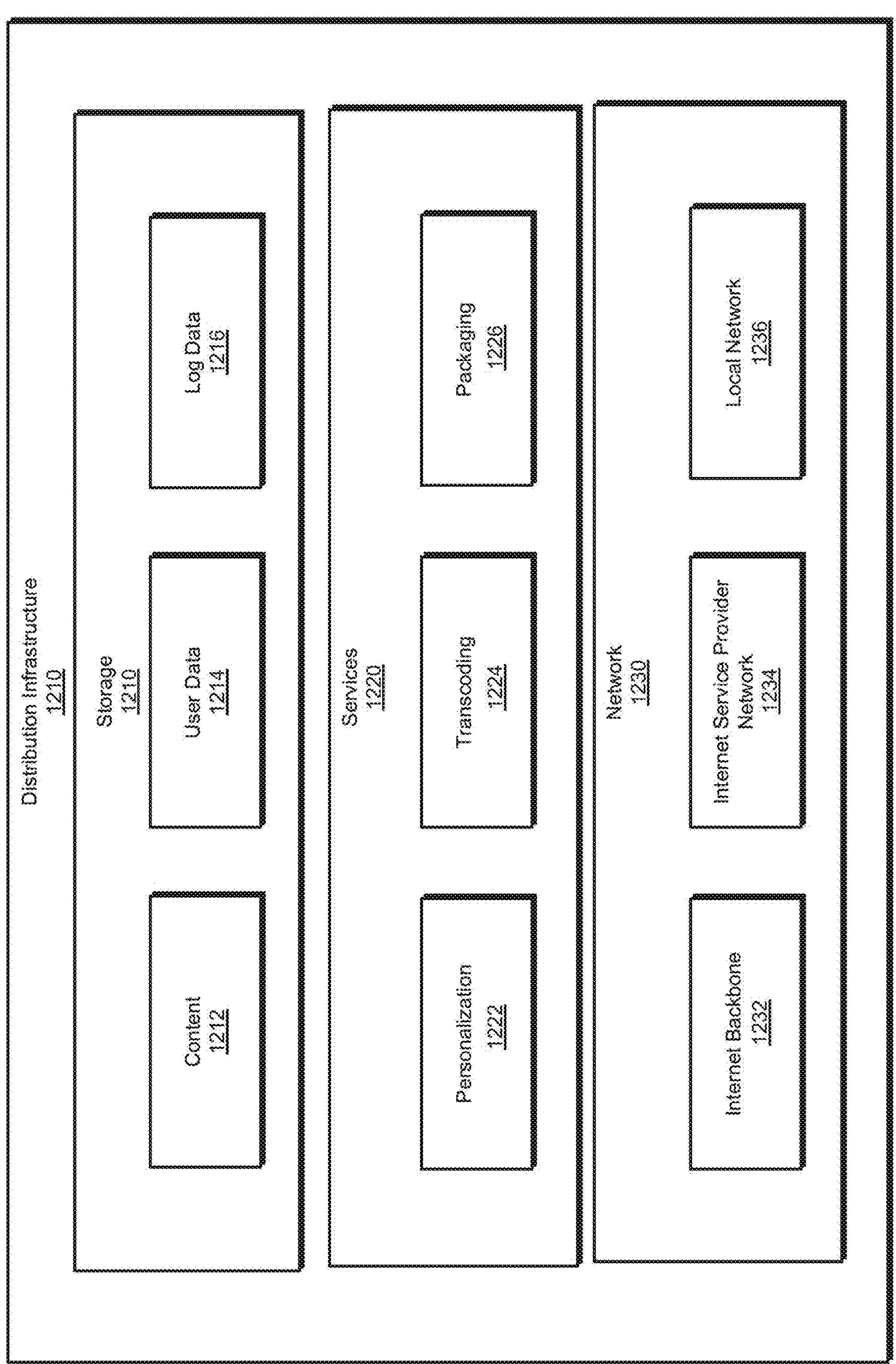
FIG. 12 is a block diagram of an exemplary distribution infrastructure within the content distribution ecosystem shown in FIG. 11.
Figure 13:
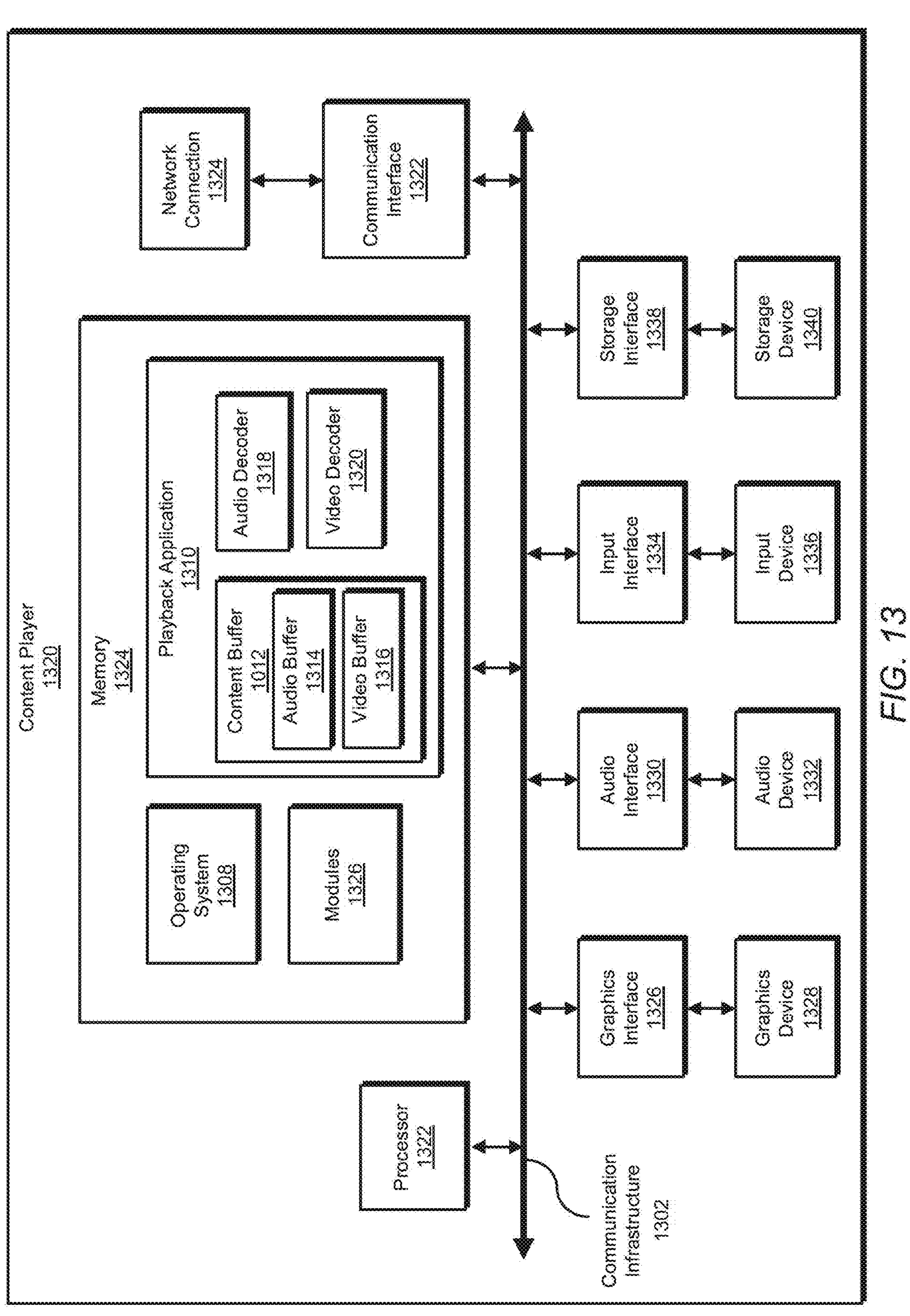
FIG. 13 is a block diagram of an exemplary content player within the content distribution ecosystem shown in FIG. 11.

The following will provide, with reference to FIG. 11, detailed descriptions of exemplary ecosystems in which content is provisioned to end nodes and in which requests for content are steered to specific end nodes. The discussion corresponding to FIGS. 12 and 13 presents an overview of an exemplary distribution infrastructure and an exemplary content player used during playback sessions, respectively.

FIG. 11 is a block diagram of a content distribution ecosystem 1100 that includes a distribution infrastructure 1110 in communication with a content player 1120. In some embodiments, distribution infrastructure 1110 is configured to encode data at a specific data rate and to transfer the encoded data to content player 1120. Content player 1120 is configured to receive the encoded data via distribution infrastructure 1110 and to decode the data for playback to a user. The data provided by distribution infrastructure 1110 includes, for example, audio, video, text, images, animations, interactive content, haptic data, virtual or augmented reality data, location data, gaming data, or any other type of data that is provided via streaming.

Distribution infrastructure 1110 generally represents any services, hardware, software, or other infrastructure components configured to deliver content to end users. For example, distribution infrastructure 1110 includes content aggregation systems, media transcoding and packaging services, network components, and/or a variety of other types of hardware and software. In some cases, distribution infrastructure 1110 is implemented as a highly complex distribution system, a single media server or device, or anything in between. In some examples, regardless of size or complexity, distribution infrastructure 1110 includes at least one physical processor 1112 and at least one memory device 1114. One or more modules 1116 are stored or loaded into memory 1114 to enable adaptive streaming, as discussed herein.

Content player 1120 generally represents any type or form of device or system capable of playing audio and/or video content that has been provided over distribution infrastructure 1110. Examples of content player 1120 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 1110, content player 1120 includes a physical processor 1122, memory 1124, and one or more modules 1126. Some or all of the adaptive streaming processes described herein is performed or enabled by modules 1126, and in some examples, modules 1116 of distribution infrastructure 1110 coordinate with modules 1126 of content player 1120 to provide adaptive streaming of multimedia content.

In certain embodiments, one or more of modules 1116 and/or 1126 in FIG. 11 represent one or more software applications or programs that, when executed by a computing device, cause the computing device to perform one or more tasks. For example, and as will be described in greater detail below, one or more of modules 1116 and 1126 represent modules stored and configured to run on one or more general-purpose computing devices. One or more of modules 1116 and 1126 in FIG. 11 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 1112 and 1122 generally represent any type or form of hardware-implemented processing unit capable of interpreting and/or executing computer-readable instructions. In one example, physical processors 1112 and 1122 access and/or modify one or more of modules 1116 and 1126, respectively. Additionally or alternatively, physical processors 1112 and 1122 execute one or more of modules 1116 and 1126 to facilitate adaptive streaming of multimedia content. Examples of physical processors 1112 and 1122 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 1114 and 1124 generally represent any type or form of volatile or non-volatile storage device or medium capable of storing data and/or computer-readable instructions. In one example, memory 1114 and/or 1124 stores, loads, and/or maintains one or more of modules 1116 and 1126. Examples of memory 1114 and/or 1124 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 12 is a block diagram of exemplary components of content distribution infrastructure 1110 according to certain embodiments. Distribution infrastructure 1110 includes storage 1210, services 1220, and a network 1230. Storage 1210 generally represents any device, set of devices, and/or systems capable of storing content for delivery to end users. Storage 1210 includes a central repository with devices capable of storing terabytes or petabytes of data and/or includes distributed storage systems (e.g., appliances that mirror or cache content at Internet interconnect locations to provide faster access to the mirrored content within certain regions). Storage 1210 is also configured in any other suitable manner.

As shown, storage 1210 may store a variety of different items including content 1212, user data 1214, and/or log data 1216. Content 1212 includes television shows, movies, video games, user-generated content, and/or any other suitable type or form of content. User data 1214 includes personally identifiable information (PII), payment information, preference settings, language and accessibility settings, and/or any other information associated with a particular user or content player. Log data 1216 includes viewing history information, network throughput information, and/or any other metrics associated with a user's connection to or interactions with distribution infrastructure 1110.

Services 1220 includes personalization services 1222, transcoding services 1224, and/or packaging services 1226. Personalization services 1222 personalize recommendations, content streams, and/or other aspects of a user's experience with distribution infrastructure 1110. Encoding services 1224 compress media at different bitrates which, as described in greater detail below, enable real-time switching between different encodings. Packaging services 1226 package encoded video before deploying it to a delivery network, such as network 1230, for streaming.

Network 1230 generally represents any medium or architecture capable of facilitating communication or data transfer. Network 1230 facilitates communication or data transfer using wireless and/or wired connections. Examples of network 1230 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 12, network 1230 includes an Internet backbone 1232, an internet service provider 1234, and/or a local network 1236. As discussed in greater detail below, bandwidth limitations and bottlenecks within one or more of these network segments triggers video and/or audio bit rate adjustments.

FIG. 13 is a block diagram of an exemplary implementation of content player 1120 of FIG. 11. Content player 1120 generally represents any type or form of computing device capable of reading computer-executable instructions. Content player 1120 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 13, in addition to processor 1122 and memory 1124, content player 1120 includes a communication infrastructure 1302 and a communication interface 1322 coupled to a network connection 1324. Content player 1120 also includes a graphics interface 1326 coupled to a graphics device 1328, an input interface 1334 coupled to an input device 1336, and a storage interface 1338 coupled to a storage device 1340.

Communication infrastructure 1302 generally represents any type or form of infrastructure capable of facilitating communication between one or more components of a computing device. Examples of communication infrastructure 1302 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 1124 generally represents any type or form of volatile or non-volatile storage device or medium capable of storing data and/or other computer-readable instructions. In some examples, memory 1124 stores and/or loads an operating system 1308 for execution by processor 1122. In one example, operating system 1308 includes and/or represents software that manages computer hardware and software resources and/or provides common services to computer programs and/or applications on content player 1120.

Operating system 1308 performs various system management functions, such as managing hardware components (e.g., graphics interface 1326, audio interface 1330, input interface 1334, and/or storage interface 1338). Operating system 1308 also provides process and memory management models for playback application 1310. The modules of playback application 1310 includes, for example, a content buffer 1312, an audio decoder 1318, and a video decoder 1320.

Playback application 1310 is configured to retrieve digital content via communication interface 1322 and to play the digital content through graphics interface 1326. Graphics interface 1326 is configured to transmit a rendered video signal to graphics device 1328. In normal operation, playback application 310 receives a request from a user to play a specific title or specific content. Playback application 310 then identifies one or more encoded video and audio streams associated with the requested title. After playback application 1310 has located the encoded streams associated with the requested title, playback application 1310 downloads sequence header indices associated with each encoded stream associated with the requested title from distribution infrastructure 1110. A sequence header index associated with encoded content includes information related to the encoded sequence of data included in the encoded content.

In one embodiment, playback application 1310 begins downloading the content associated with the requested title by downloading sequence data encoded to the lowest audio and/or video playback bit rates to minimize startup time for playback. The requested digital content file is then downloaded into content buffer 1312, which is configured to serve as a first-in, first-out queue. In one embodiment, each unit of downloaded data includes a unit of video data or a unit of audio data. As units of video data associated with the requested digital content file are downloaded to the content player 1120, the units of video data are pushed into the content buffer 1312. Similarly, as units of audio data associated with the requested digital content file are downloaded to the content player 1120, the units of audio data are pushed into the content buffer 1312. In one embodiment, the units of video data are stored in video buffer 1316 within content buffer 1312 and the units of audio data are stored in audio buffer 1314 of content buffer 1312.

A video decoder 1310 reads units of video data from video buffer 1316 and outputs the units of video data in a sequence of video frames corresponding in duration to the fixed span of playback time. Reading a unit of video data from video buffer 1316 effectively de-queues the unit of video data from video buffer 1316. The sequence of video frames is then rendered by graphics interface 1326 and transmitted to graphics device 1328 to be displayed to a user.

An audio decoder 1318 reads units of audio data from audio buffer 1314 and output the units of audio data as a sequence of audio samples, generally synchronized in time with a sequence of decoded video frames. In one embodiment, the sequence of audio samples is transmitted to audio interface 1330, which converts the sequence of audio samples into an electrical audio signal. The electrical audio signal is then transmitted to a speaker of audio device 1332, which, in response, generates an acoustic output.

In situations where the bandwidth of distribution infrastructure 1110 is limited and/or variable, playback application 1310 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 1326 is configured to generate frames of video data and transmit the frames of video data to graphics device 1328. In one embodiment, graphics interface 1326 is included as part of an integrated circuit, along with processor 1122. Alternatively, graphics interface 1326 is configured as a hardware accelerator that is distinct from (i.e., is not integrated within) a chipset that includes processor 1122.

Graphics interface 1326 generally represents any type or form of device configured to forward images for display on graphics device 1328. For example, graphics device 1328 is fabricated using liquid crystal display (LCD) technology, cathode-ray technology, and light-emitting diode (LED) display technology (either organic or inorganic). In some embodiments, graphics device 1328 also includes a virtual reality display and/or an augmented reality display. Graphics device 1328 includes any technically feasible means for generating an image for display. In other words, graphics device 1328 generally represents any type or form of device capable of visually displaying information forwarded by graphics interface 1326.

As illustrated in FIG. 13, content player 1120 also includes at least one input device 1336 coupled to communication infrastructure 1302 via input interface 1334. Input device 1336 generally represents any type or form of computing device capable of providing input, either computer or human generated, to content player 1120. Examples of input device 1336 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 1120 also includes a storage device 1340 coupled to communication infrastructure 1302 via a storage interface 1338. Storage device 1340 generally represents any type or form of storage device or medium capable of storing data and/or other computer-readable instructions. For example, storage device 1340 may be a magnetic disk drive, a solid-state drive, an optical disk drive, a flash drive, or the like. Storage interface 1338 generally represents any type or form of interface or device for transferring data between storage device 1340 and other components of content player 1120.

Many other devices or subsystems are included in or connected to content player 1120. Conversely, one or more of the components and devices illustrated in FIG. 13 need not be present to practice the embodiments described and/or illustrated herein. The devices and subsystems referenced above are also interconnected in different ways from that shown in FIG. 13. Content player 1120 is also employed in any number of software, firmware, and/or hardware configurations. For example, one or more of the example embodiments disclosed herein are encoded as a computer program (also referred to as computer software, software applications, computer-readable instructions, or computer control logic) on a computer-readable medium. The term "computer-readable medium," as used herein, refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, etc.), optical-storage media (e.g., Compact Disks (CDs), Digital Video Disks (DVDs), and BLU-RAY disks), electronic-storage media (e.g., solid-state drives and flash media), and other digital storage systems.

A computer-readable medium containing a computer program is loaded into content player 1120. All or a portion of the computer program stored on the computer-readable medium is then stored in memory 1124 and/or storage device 1340. When executed by processor 1122, a computer program loaded into memory 1124 causes processor 1122 to perform and/or be a means for performing the functions of one or more of the example embodiments described and/or illustrated herein. Additionally or alternatively, one or more of the example embodiments described and/or illustrated herein are implemented in firmware and/or hardware. For example, content player 1120 is configured as an Application Specific Integrated Circuit (ASIC) adapted to implement one or more of the example embodiments disclosed herein Example Embodiments 1. A computer-implemented method comprising: accessing a media item that includes a plurality of media item segments that are to be played back in a specific manner, generating a plurality of playgraphs for the media item, the playgraphs defining various different playback paths between media item segments, selecting a specific playgraph from the plurality of generated playgraphs, and providing the selected playgraph to a playback device, wherein playback of the media item according to the selected playgraph provides a customized presentation of the media item.

2. The computer-implemented method of claim 1, further comprising creating one or more virtual assets for the media item, each virtual asset including a unique identifier that ties the virtual asset to the media item and a specific selected playgraph that provides a defined playback pathway through the media item segments.

3. The computer-implemented method of claim 3, wherein the media item includes a plurality of associated virtual assets.

4. The computer-implemented method of claim 3, further comprising: determining that the media item is to be played back on the playback device, selecting a specific virtual asset among the plurality of virtual assets, and streaming the media item and the selected virtual asset to the playback device, such that the media item is playable on the playback device using the playgraph identified in the virtual asset.

5. The computer-implemented method of claim 3, wherein a specific virtual asset is selected for the playback device based on one or more personalization characteristics associated with a user of the playback device.

6. The computer-implemented method of claim 5, wherein the personalized virtual asset identifies specific media item segments selected to appeal to the user of the playback device.

7. The computer-implemented method of claim 6, wherein the personalized virtual asset further orders the identified media item segments in a specified order that is designed to appeal to the user of the playback device.

8. The computer-implemented method of claim 7, wherein the virtual assets identify the associated media item segments and the playback order using metadata tags.

9. The computer-implemented method of claim 6, wherein the media item comprises a preview of a movie or television show, and wherein the preview includes at least one introductory segment and at least one body segment.

10. The computer-implemented method of claim 6, wherein the media item segments are selected from a plurality of different movies or television shows.

11. The computer-implemented method of claim 3, further comprising: selecting a specified virtual asset among the plurality of associated virtual assets, and sending the unique identifier for the selected virtual asset to the playback device, such that the playback device plays back the media item according to a stored playgraph that is associated with the virtual asset identified by the unique identifier.

12. A system comprising: at least one physical processor and physical memory comprising computer-executable instructions that, when executed by the physical processor, cause the physical processor to: access a media item that includes a plurality of media item segments that are to be played back in a specific manner, generate a plurality of playgraphs for the media item, the playgraphs defining various different playback paths between media item segments, select a specific playgraph from the plurality of generated playgraphs, and provide the selected playgraph to a playback device, wherein playback of the media item according to the selected playgraph provides a customized presentation of the media item.

13. The system of claim 12, further comprising dynamically creating a virtual asset associated with the media item upon determining that the media item is to be accessed by the playback device, the virtual asset including a unique identifier that ties the virtual asset to the media item and further including a specific selected playgraph that provides a defined playback pathway through the media item segments.

14. The system of claim 13, wherein the virtual asset is created dynamically upon determining that personalization information associated with a user that is associated with the playback device is unavailable.

15. The system of claim 14, further comprising: tracking which media item segments the user viewed on the playback device, and adding the resulting tracking information to personalization information associated with the user.

16. The system of claim 15, wherein the resulting tracking information notes which media item segments were personalized to the user and which media item segments were randomly selected.

17. The system of claim 13, further comprising generating a cadence template that aligns the media item segments of the virtual asset with one or more portions of music associated with the media item.

18. The system of claim 17, wherein the generated cadence template governs the order in which the media item segments are shown and the amount of time each media item segment is shown within the established ordering.

19. The system of claim 12, wherein the media item segments are arranged such that devices that lack playgraph support will play back at least one introductory segment and at least one body segment.

20. A non-transitory computer-readable medium comprising one or more computer-executable instructions that, when executed by at least one processor of a computing device, cause the computing device to: access a media item that includes a plurality of media item segments that are to be played back in a specific manner, generate a plurality of playgraphs for the media item, the playgraphs defining various different playback paths between media item segments, select a specific playgraph from the plurality of generated playgraphs, and provide the selected playgraph to a playback device, wherein playback of the media item according to the selected playgraph provides a customized presentation of the media item.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to create personalized media content, use the result of the transformation to provide the personalized media content to an electronic device, and store the result of the transformation to provide feedback regarding the personalized media content. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:

receiving, at a playback device, a plurality of playgraphs for a media item, the media item including a plurality of media item segments, the plurality of playgraphs defining multiple different playback paths between the plurality of media item segments;

receiving a selection input that identifies, from the plurality of playgraphs, a selected playgraph that is designed to present the media item according to a predefined series of media item segments that is arranged in a specified order; and playing back, on the playback device, the predefined series of media item segments from the media item in the specified order specified in the selected playgraph, such that playback of the media item according to the selected playgraph provides one of a plurality of customized presentations of the media item and includes at least one non-sequential media item segment that is out of order relative to an order in which the plurality of media item segments was initially encoded.

2. The computer-implemented method of claim 1, wherein the media item, including its plurality of media item segments, comprises a single data structure.

3. The computer-implemented method of claim 2, wherein the plurality of media item segments is encoded in a specified initial order.

4. The computer-implemented method of claim 1, wherein the media item includes a virtual asset including a unique identifier that ties the virtual asset to the media item and to a specific selected playgraph, the virtual asset created dynamically upon determining that personalization information associated with a user that is associated with the playback device is unavailable.

5. The computer-implemented method of claim 1, wherein the media item includes a virtual asset, the virtual asset including a unique identifier that ties the virtual asset to the media item and to a specific selected playgraph that provides a defined playback pathway through the media item segments.

6. The computer-implemented method of claim 5, wherein the media item includes a plurality of associated virtual assets.

7. The computer-implemented method of claim 6, further comprising:

receiving the selection input indicating that the media item is to be played back on the playback device;

selecting a specific virtual asset from among the plurality of associated virtual assets; and presenting the media item on the playback device using the specific selected playgraph identified in the virtual asset.

8. The computer-implemented method of claim 6, wherein a specific virtual asset is selected for presentation on the playback device based on one or more personalization characteristics associated with a user of the playback device.

9. The computer-implemented method of claim 8, wherein the specific virtual asset identifies specific media item segments selected to appeal to the user of the playback device.

10. The computer-implemented method of claim 9, wherein the specific virtual asset further orders the specific media item segments in a specified playback order that is designed to appeal to the user of the playback device.

11. The computer-implemented method of claim 10, wherein the specific virtual asset identifies the specific media item segments and the specified playback order using metadata tags.

12. The computer-implemented method of claim 9, wherein the media item comprises a preview of a movie or television show, and wherein the preview includes at least one introductory segment and at least one body segment.

13. The computer-implemented method of claim 9, wherein the media item segments are selected from a plurality of different movies or television shows.

14. The computer-implemented method of claim 6, further comprising:

receiving the selection input selecting a specified virtual asset among the plurality of associated virtual assets; and receiving the unique identifier for the specified virtual asset at the playback device, wherein the playback device plays back the media item according to a stored playgraph that is associated with the specified virtual asset identified by the unique identifier.

15. A system comprising:

at least one physical processor; and physical memory comprising computer-executable instructions that, when executed by the at least one physical processor, cause the at least one physical processor to:

receive, at a playback device, a plurality of playgraphs for a media item, the media item including a plurality of media item segments, the plurality of playgraphs defining multiple different playback paths between the plurality of media item segments;

receive a selection input that identifies, from the plurality of playgraphs, a selected playgraph that is designed to present the media item according to a predefined series of media item segments that is arranged in a specified order; and play back, on the playback device, the predefined series of media item segments from the media item in the specified order specified in the selected playgraph, such that playback of the media item according to the selected playgraph provides one of a plurality of customized presentations of the media item and includes at least one non-sequential media item segment that is out of order relative to an order in which the plurality of media item segments was initially encoded.

16. The system of claim 15, wherein the media item includes a virtual asset, the virtual asset including a unique identifier that ties the virtual asset to the media item and to a specific selected playgraph that provides a defined playback pathway through the media item segments.

17. The system of claim 16, wherein the virtual asset is created dynamically upon determining that personalization information associated with a user that is associated with the playback device is unavailable.

18. The system of claim 17, further comprising:

tracking which media item segments the user viewed on the playback device; and adding resulting tracking information to the personalization information associated with the user.

19. The system of claim 18, wherein the resulting tracking information notes which media item segments were personalized to the user and which media item segments were randomly selected.

20. A non-transitory computer-readable medium comprising one or more computer-executable instructions that, when executed by at least one processor of a computing device, cause the computing device to:

receive, at a playback device, a plurality of playgraphs for a media item, the media item including a plurality of media item segments, the plurality of playgraphs defining multiple different playback paths between the plurality of media item segments;

receive a selection input that identifies, from the plurality of playgraphs, a selected playgraph that is designed to present the media item according to a predefined series of media item segments that is arranged in a specified order; and play back, on the playback device, the predefined series of media item segments from the media item in the specified order specified in the selected playgraph, such that playback of the media item according to the selected playgraph provides one of a plurality of customized presentations of the media item and includes at least one non-sequential media item segment that is out of order relative to an order in which the plurality of media item segments was initially encoded.

* * * * *